United States Patent [19]

Kurtz et al.

[11] 4,222,277

[45] Sep. 16, 1980

[54] MEDIA COMPATIBLE PRESSURE TRANSDUCER

[75] Inventors: Anthony D. Kurtz, Englewood; Joseph R. Mallon, Franklin Lakes, both of N.J.

[73] Assignee: Kulite Semiconductor Products, Inc., Ridgefield, N.J.

[21] Appl. No.: 65,886

[22] Filed: Aug. 13, 1979

[51] Int. Cl.³ ............................................. G01L 9/06
[52] U.S. Cl. .................................... 73/721; 73/727; 338/4
[58] Field of Search .................... 73/721, 727, 777; 338/4, 42

[56] References Cited

U.S. PATENT DOCUMENTS

| | | | |
|---|---|---|---|
| 2,336,500 | 12/1943 | Osterberg | 73/720 |
| 4,021,766 | 5/1977 | Aine | 338/4 |
| 4,023,562 | 5/1977 | Hynecek et al. | 73/727 |
| 4,131,088 | 12/1978 | Reddy | 338/4 |

FOREIGN PATENT DOCUMENTS 556361  5/1977  U.S.S.R. ................................ 73/720

*Primary Examiner*—Donald O. Woodiel
*Attorney, Agent, or Firm*—Arthur L. Plevy

[57] ABSTRACT

There is disclosed an absolute pressure transducer which is adaptable for use in various deleterious mediums. A single wafer contains a gage sensor configuration on one portion and an absolute sensor configuration on another adjacent portion. An active diaphragm area is defined for each sensor configuration by forming a depression beneath the sensor locations. A base member is bonded or secured to the wafer at the side containing the depressions. An aperture is directed through the base member to communicate with the depression associated with the gage sensor configuration and is employed as an external pressure port. The top surface of the wafer which contains the sensors is exposed to a relatively clean source of pressure to thereby enable the absolute sensor section to monitor this pressure, while the gage sensor section responds to both pressures.

17 Claims, 7 Drawing Figures

MEDIA COMPATIBLE PRESSURE TRANSDUCER

BACKGROUND OF THE INVENTION

This invention relates to pressure transducers and more particularly to an economical pressure transducer employing piezoresistive transducers and adapted to respond to a differential pressure.

The piezoresistive sensor has achieved widespread use as a pressure or force measuring element. In general, the prior art is replete with a number of patents which describe various configurations and methods of fabricating the piezoresistive device. Presently, there is an increasing demand for the use of pressure transducers in various industries. As such, these devices have to be reliable, while relatively economical. For example, in the automotive industry, pressure transducers are employed to measure the pressure of various engine fluids or to measure the pressure at the manifold. In any event, the piezoresistor is an attractive configuration in regard to such uses.

Basically, the piezoresistive device can be fabricated by conventional integrated circuit capability and hence, is compatible and can be made using the same techniques as are being presently employed for the manufacture of microprocessors and other integrated circuits which are being employed in automobiles and for other commercial operations, as well.

The automobile industry and many other industries as well require an absolute pressure sensor. Such a device has an output which is always referenced to vacuum. Differential pressure measurements can be accomplished by a differential transducer which provides an output which is the difference between two pressures. In the case of a gage sensor one of these pressures is atmospheric pressure and the other pressure is the pressure being monitored. Essentially, a gage transducer produces an output which is the difference between atmospheric pressure and the monitored pressure. In the case of the absolute pressure transducer, the output is truly indicative of monitored pressure.

While the use of piezoresistive sensors in such applications is desirable, there presents a number of problems associated in employing such devices. A piezoresistive device, as indicated, usually consists of a bridge pattern of resistors which are mounted or diffused on one side of a relatively thin diaphragm member. The diaphragm which may be fabricated from silicon, deflects upon applications of a pressure thereto causing the piezoresistors to vary their magnitude according to the deflection of the diaphragm. In regard to such devices, there is one side of the device which contains the resistors which must be exposed to a first pressure. The other side of the diaphragm is also exposed to a pressure.

In the case of an absolute transducer, it is extremely difficult using standard economical integrated circuit wafer fabrication and packaging techniques to form a reference pressure on the circuit side of the sensing diaphragm. The monitored pressure is best applied to the backside of the diaphragm or side not containing sensing circuitry and leadwires in order to provide best protection from deleterious atmospheres for instance those containing various types of engine pollutants and other substances which would effect the sensors and or other circuitry on the front of the diaphragm.

It is therefore an object of the present invention to provide an absolute pressure transducer which is capable of operating in contaminated environments and simple to construct. Such devices can be mass produced as lending themselves to integrated circuit construction techniques and based on such techniques, are economical and reliable.

BRIEF DESCRIPTION OF THE PREFERRED EMBODIMENT

An absolute pressure transducer comprising a wafer of a semiconductor material having located on a bottom surface thereof, first and second recesses defining first and second active diaphragm areas, a first sensor means located on a top surface of said wafer above and within said first active area as defined by said first recess, and second sensor means located on said top surface of said wafer above and within said second active area as defined by said second recess, means adapted to apply a first pressure to said top surface of said wafer to cause said first and second sensor means to respond thereto, means adapted to apply a second pressure to said second recess to cause only said second sensor means to respond thereto, and means coupling said first and second sensor means in a bridge configuration to provide an output indicative of said second pressure applied to said recess as referenced to said first pressure.

DETAILED DESCRIPTION OF THE INVENTION

Figure 1:
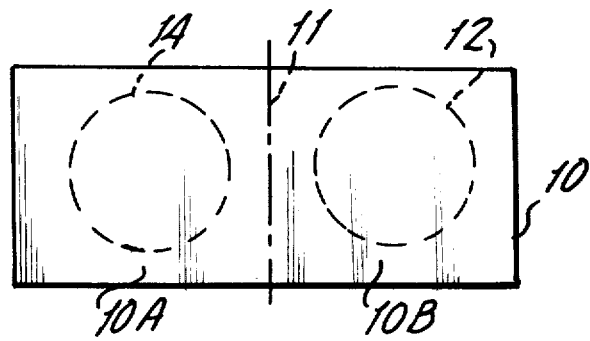
FIG. 1 is a top plan view of a semiconductor wafer employed in this invention.

Referring to FIG. 1, there is shown a relatively rectangular wafer 10 of silicon or other suitable semiconductor material which can be processed or otherwise treated to accommodate a plurality of piezoresistive sensors. Essentially, the wafer 10 may be extremely small and typical dimensions, for example, would be approximately 0.075" by 0.15". It is, of course, understood that other dimensions can be accommodated.

Shown in FIG. 1 is an imaginary center line 11 which serves to divide the wafer 10 approximately into two equal rectangular sections 10A and 10B. According to the teachings of this invention, a first sensor configuration which will be designated as a gage sensor arrangement, is fabricated within an active area 12 located on the portion 10B. Located on portion 10A is another active area 14 which will accommodate an additional sensor configuration for monitoring atmospheric pressure and for monitoring an additional reference pressure. The active areas are shown as being relatively circular in format but other geometrical configurations would suffice as well.

Figure 2:
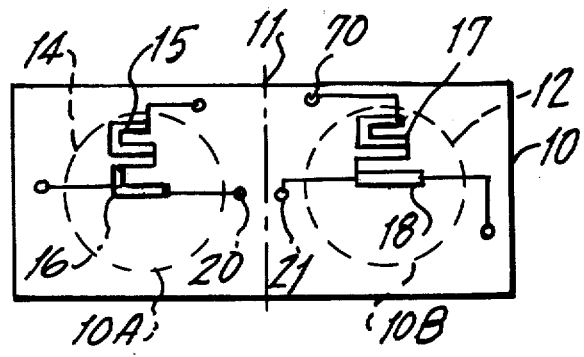
FIG. 2 is a top plan view of the wafer of FIG. 1 showing piezoresistors positioned on respective portions.

Referring to FIG. 2, within the active area 14 there is deposited a first piezoresistive sensor 15 which is located near the peripheral edge of the active area 15. A second gage 16 is deposited near the central region of the active area 15. In a similar manner, a peripheral gage 17 is deposited within the active area 12 and a central gage 18 is deposited within the active area 12 located on portion 10B. The appropriate terminals are brought out to the nonactive areas of the diaphragms via suitable deposited leads which terminate in suitable terminal configurations.

Techniques for forming piezoresistive elements on semiconductor diaphragms such as silicon are widely known in the prior art and reference is made to U.S. Pat. No. 3,654,579 entitled ELECTROMECHANICAL TRANSDUCERS AND HOUSINGS which is assigned to the Assignee herein. Other patents such as U.S. Pat. No. 3,753,196 entitled TRANSDUCERS EMPLOYING INTEGRAL PROTECTIVE COATINGS AND SUPPORTS also describe suitable fabrication techniques. It is thus clearly understood that the piezoresistive elements as 15-18 can be deposited or diffused or grown on the wafer 10 in exact location and position as shown in FIG. 2.

Essentially, each portion as 10A and 10B contain a half bridge configuration with a peripheral sensor as 15 and 17 and a central sensor as 16 and 18. These sensors can be wired via output terminals as 20 and 21 to form a Wheatstone bridge configuration which is perhaps the most widely used circuit arrangement in the transducer art.

Figure 3:
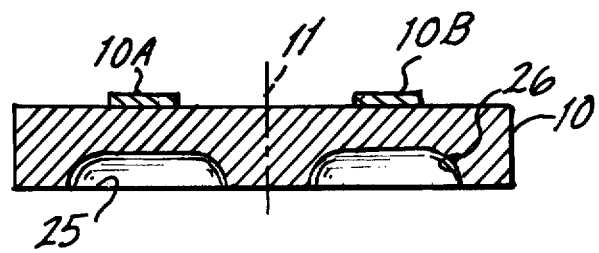
FIG. 3 is a side cross sectional view of a processed wafer.

After or prior to deposition of the semiconductor element, the wafer 10 is etched or otherwise machined to form two bottom cavities or recesses 25 and 26 as shown in FIG. 3. The recesses may be circular in shape and conform to the active areas 14 and 12 as shown respectively for sections 10A and 10B of wafer 10. In this manner, the material between the top surface of the wafer 10 and the top surface of the cavities 25 and 26 forms a diaphragm structure which will deflect upon application of a force thereto.

Figure 4:
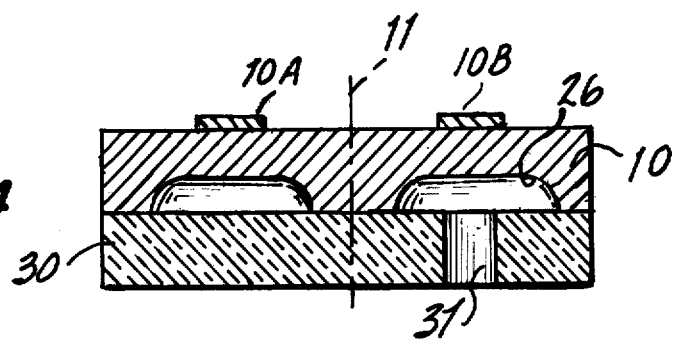
FIG. 4 is a side cross sectional view of a processed wafer secured to a base plate.

Referring to FIG. 4, the processed wafer is then bonded to a base plate 30 which is relatively thick as compared to the thickness of the wafer 10. The base plate 30 may be glass, silicon, or some other material. If it is glass, bonding is implemented by a diffusion bonding technique. This technique is also well known and is described, for example, in U.S. Pat. No. 4,040,172 entitled METHOD OF MANUFACTURING INTEGRAL TRANSDUCER ASSEMBLIES EMPLOYING BUILT-IN PRESSURE LIMITING and assigned to the Assignee herein.

An aperture 31 communicates directly with the cavity 26 which is associated with the gage sensor arrangement positioned on section 10B of wafer 10. Aperture 31 thereby permits the application of an external pressure to be monitored to the underside of the diaphragm associated with section 10B of the wafer 10.

Figure 5:
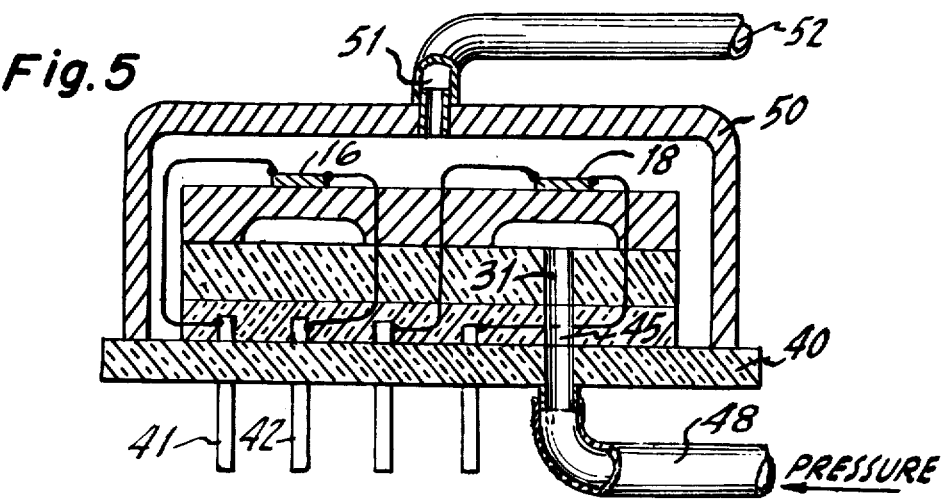
FIG. 5 is a sectional view of a transducer and housing configuration according to this invention.

Referring to FIG. 5, there is shown the transducer configuration of FIG. 4 mounted in a transistor type header or housing. The housing basically consists of a bottom base 40 fabricated from a suitable metal, epoxy, plastic, etc. The transistor header has a series of pins as 41 and 42 emanating from the base portion 40.

The transducer assembly as shown in FIG. 4 is mounted on the header and the aperture 31 is aligned with an aperture 45 in the header to a pressure tube or pressure port 48. Hence, the tube 48 may be directed to a point of pressure to be monitored which may, for example, be the manifold of an engine or an oil reservoir and so on.

It is ascertained that the atmosphere associated with the pressure port 48 may contain many deleterious substances. However, these substances can only couple to the underside of the diaphragm and hence, the sensor elements as 17 and 18 associated with section 10B, associated lead out wires and other circuitry contained in the header assembly, are not effected by any of the substances included in the pressure environment associated with the port 48.

Once the transducer structure is emplaced as shown, a metallic cylindrical housing or can configuration 50 is mounted about the base 40 and sealed or secured thereto. The cylindrical housing 50 has an aperture 51 on the top or a suitable surface thereof and this aperture is directed to a reference pressure port via a suitable tube as 52.

Figure 6:
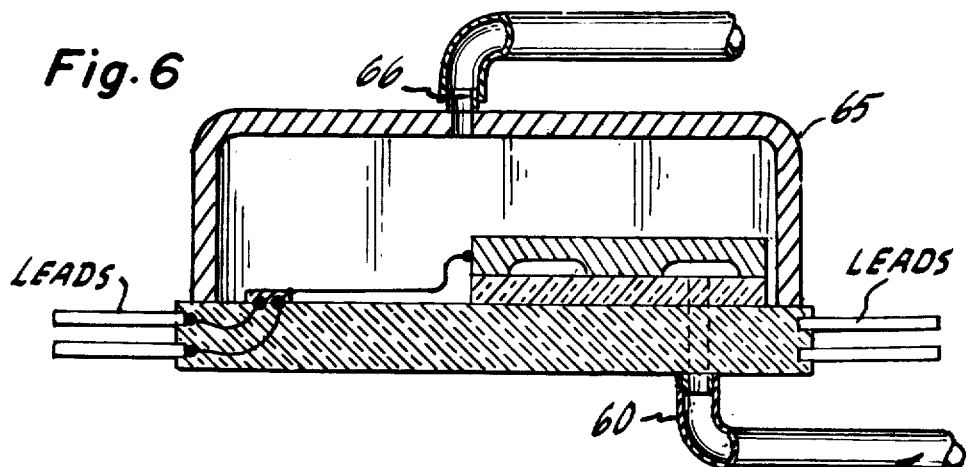
FIG. 6 is another cross sectional view of an alternative transducer housing.

While the transducer configuration is shown mounted in a transistor type header in FIG. 5, it is understood that the configuration and structure of FIG. 4 could also be mounted in many other ways for instance in a flat pack arrangement where the transducer device as shown in FIG. 6, is coupled to a pressure port 60 for applying an external pressure to the underside of the diaphragm associated with section 10B. The top of the flat pack or cover 65 contains a reference pressure aperture 66 which is associated with the reference pressure port for directing an atmospheric or a relatively clean source of pressure to the transducer.

Referring to the above configurations and particularly considering FIGS. 5 and 6, it is immediately seen that the sensor configuration formed on wafer section 10A is subjected only to atmospheric pressure or a reference pressure which, for example, is applied via ports 52 or 66 of FIGS. 5 and 6. This pressure, in the case of a typical transducer, would be derived from atmospheric pressure and for example, may be the pressure available in the engine or passenger compartment or other location of an automobile and as such, is relatively clear and unpolluted. In this manner, the sensors as 15-17 which are respectively located on sections 10A and 10B are both subjected to atmospheric pressure from a relatively clean source.

It is known that such sensors may be protected further, if desired, by an external thin layer of silicon dioxide or a coating with a substance such as parylene or other material of suitable chemical and mechanical properties. In any event, such material should be thin as if the materials are made thicker, they adversely effect the characteristics of the transducer structure. Thus, the relatively clean pressure applied via ports 52 or 56 need not be absolutely contaminant free since this additional protection may be provided. This invention however allows for minimum amount of protection since the most contaminated pressure source is directed to the least sensitive and most readily protected surface.

The operation of the pressure transducer as shown in FIGS. 5 and 6 is extremely interesting and provides an output at all times which is always relative to the atmospheric pressure.

This relationship may be expressed as follows:

$P_{(Indicated)} = P_{(abs)(x)} - P_{(atm)} + P_{(atm)}$
$P_{(abs)} =$ Absolute Pressure
$P_{(atm)} =$ Atmospheric Pressure The first two terms on the right side arise from the response of sensing diaphragm 10B while the last term arises from the response of sensor 10A. Thus:

$$P_{(Indicated)} = P_{(abs)} (x)$$

which is the desired response of the instrument.

Figure 7:
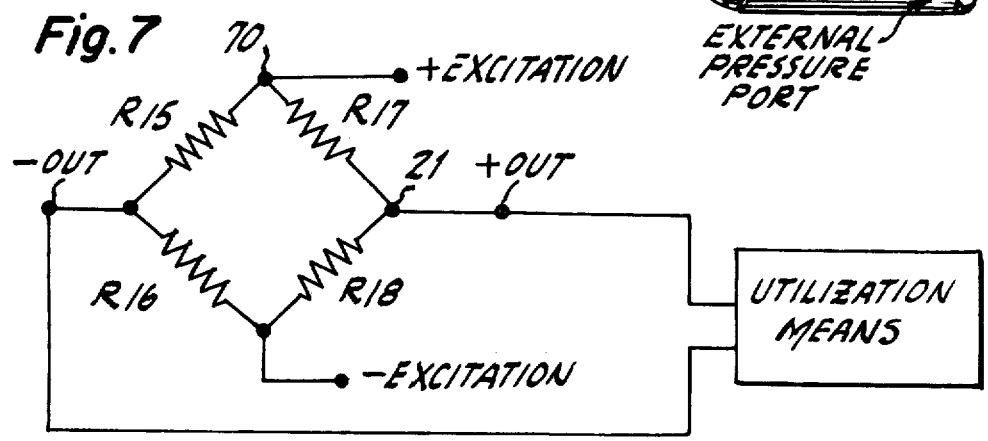
FIG. 7 is a schematic diagram of a bridge configuration employing the piezoresistors according to this invention.

Referring to FIG. 7, there is shown a typical Wheatstone bridge configuration wherein the four resistors R15 to R18 are shown positioned in the bridge. By referring to FIG. 2, it is seen that resistor R17 is a peripheral piezoresistor and associated with the gage section. A positive excitation is applied to the free terminal 70 of resistor 17. The common terminal 21 between resistors 17 and 18 is the positive output. The free terminal of resistor 18 goes to the negative excitation or input. In a similar manner, the peripheral resistor 15 is connected to terminal 70, while the free end of resistor 16, (the central resistor associated with the absolute sensor 10A), goes to the minus excitation or minus input. The common terminal between resistors 15 and 16 is designated as the minus output. Of course other methods of electrically adding the outputs can be employed.

Hence, assume that a pressure of 15 psia is applied to port 51 of FIG. 5 and a pressure of 15 psia is also applied to port 48 of FIG. 5. The resistors R17 and R18 will not change due to the fact that the pressure on both sides of the diaphragm is the same. However, for a pressure applied via port 51, resistors 15 and 16 will change as the peripheral resistor 15 will go up in value, while the central resistor 16 will go down in value. Hence, there is an output from the bridge which corresponds to 15 psia or is indicative of atmospheric pressure. This is so because the pressure at the monitored port which is port 48, is in fact 15 psia.

Now assume that the pressure at port 48 decreases to 13 psia. The pressure on port 51 is still at 15 psia. In this configuration, the resistance of the peripheral resistor R17 will go up due to the fact that there is more pressure on port 51 than port 48 and the resistance of R18 will go down based on the same consideration. However, the change in resistance is directly proportional to the difference in pressure to give an effective negative output of −2 psia between resistors R17 and R18. However, the pressure of 15 psia on resistors 15 and 16 will cause them to change exactly as in the above noted example which namely corresponds to a pressure of 15 psia. However, the bridge will produce an effective output which is the difference between 15 psia and 2 psia and hence, the output of the bridge will indicate 13 psia which is the exact pressure applied to the external pressure port.

Thus, for a positive pressure on the external pressure ports 48 and 60, the peripheral sensor 17 associated with the gage sensor unit goes down in value, while the central resistor 18 goes up in value and the opposite is true for pressure applied to the top side of the diaphragm. Accordingly, in the bridge configuration shown in FIG. 7, the output between the plus and minus terminals is always indicative of the exact pressure at the external port in relation to the atmospheric pressure. Hence, no matter how the atmospheric pressure varies, the output of the circuit of FIG. 7 will always give the correct absolute pressure reading associated with the pressure port 48 of FIG. 5 or 60 of FIG. 6.

A Wheatstone bridge is a convenient way of interconnecting the two sensing diaphragms but many other ways are possible. For instance, the outputs may be separately amplified and signal conditioned and summed by conventional analog circuit techniques. Alternately, an A to D conversion may be performed with the signal being combined digitally for instance by utilizing a microprocessor or other digital circuitry.

It is seen that the structure shown in FIGS. 1–4 has great utility and produces a very reliable output. Both sensor configurations are formed on the same wafer 10 and hence, the sensitivity of the respective diaphragms are very well matched since they are manufactured side by side. In a similar manner, the piezoresistive sensors are deposited employing the same techniques and the same manufacturing processes and hence, their characteristics in regard to electrical and temperature specifications are matched based on the fact that the processing, etching and other techniques employed are relatively identical.

It is also apparent that if there are differences between the units, the individual units can be separately compensated for and hence, the absolute sensors can be compensated independently of the gage sensors by employing resistor or other compensating techniques which are well known in the transducer art.

It is further indicated that if one section such as 10A or 10B has a different sensitivity than the other, the section with the higher sensitivity can be separately loaded or compensated so that the sensitivity in both sections is approximately the same.

The technique of applying series or shunt resistors to various bridge elements is well known as a method of effecting zero balance and temperature coefficient of zero compensation for piezoresistive transducers. In general two temperature insensitive resistors will effect such compensation. It can be shown that the addition of a third temperature insensitive element will provide for the required sensitivity matching of the two diaphragms. The specific circuit and values of these elements are a function of the values of zero offset, zero shift with temperature and sensitivity mismatch. The number of elements may be reduced as temperature sensitive compensating elements are employed.

Thus, there has been described an absolute pressure sensor using integrated circuit techniques; which sensor has great flexibility in regard to prior art devices and which is extremely economical and reliable.

What is claimed is:

1. An absolute pressure transducer, comprising:
   (a) a wafer of a semiconductor material having located on a bottom surface thereof, first and second recesses defining first and second active diaphragm areas,
   (b) a first sensor means located on a top surface of said wafer above and within said first active area as defined by said first recess, and second sensor means located on said top surface of said wafer above and within said second active area as defined by said second recess,
   (c) means adapted to apply a first pressure to said top surface of said wafer to cause said first and second sensor means to respond thereto,
   (d) means adapted to apply a second pressure to said second recess to cause only said second sensor means to respond thereto, and
   (e) means coupling said first and second sensor means in a bridge configuration to provide an output indicative of said second pressure applied to said recess as referenced to said first pressure.

2. The transducer according to claim 1, further comprising:
(a) a base plate secured to said bottom surface of said wafer to cover said first and second recesses, said plate having an aperture located therein and communicating with said second recess for application thereto of said second pressure.

3. The transducer according to claim 2 wherein said base plate is fabricated from glass and bonded to said wafer by a diffusion bond.

4. The transducer according to claim 2 wherein said base plate is fabricated from a semiconductor material.

5. The transducer according to claim 1 wherein said wafer is fabricated from silicon.

6. The transducer according to claim 1 wherein said first and second sensor means each comprise a first peripheral piezoresistive device located in said top surface near the edge of said associated recess and a second piezoresistive device located relatively centrally with respect to said recess.

7. The transducer according to claim 1 further comprising:
a housing having an internal hollow for accommodating said wafer with a surface of said housing having a first aperture therein communicating with said top surface of said wafer and with another surface of said housing having a second aperture communicating solely with said second recess.

8. The transducer according to claim 7 further including means coupled to said first aperture adapted to apply a reference pressure thereto derived from a relatively clean environment, and means coupled to said second aperture adapted to apply another pressure thereto derived from a relatively deleterious environment.

9. The transducer according to claim 1 wherein said wafer is fabricated from silicon and is relatively rectangular in configuration.

10. An absolute pressure transducer, comprising:
(a) a wafer of a semiconductor material having a top and bottom surface with relatively thin side surfaces, said bottom surface having first and second circular recesses adjacent one another and relatively of the same diameter manifesting a first and second diaphragm area,
(b) a base plate secured to said bottom surface to cover said recesses with said base plate having an aperture communicating solely with said second circular recess,
(c) a first piezoresistive circuit arrangement mounted on said top surface of said wafer above said first depression with a peripheral sensor located near an edge of said recess and a central sensor located near the center of said recess,
(d) a second piezoresistive circuit arrangement mounted on said top surface of said wafer above said second recess with a peripheral sensor located near an edge of said recess and a central sensor located near the center of said recess,
(e) means for applying a reference pressure to said top surface of said wafer,
(f) means for applying another pressure to said aperture in said base plate for directing the same solely to said second recess, and
(g) means coupling said piezoresistive sensors in a circuit arrangement to cause said circuit to provide an output indicative of said another pressure as referenced to said reference pressure.

11. The pressure transducer according to claim 9 further including a housing having an internal hollow with said wafer positioned within said hollow, said housing having a first aperture in a surface thereof communicating with said top surface of said wafer, and a second aperture in a surface thereof communicating with said second recess and means coupled to said first and second apertures adapted to respectively apply said reference and said another pressure thereto.

12. The transducer according to claim 9 wherein said wafer is rectangular in shape and fabricated from silicon.

13. The transducer according to claim 11 wherein said base plate is rectangular in shape and relatively congruent with said wafer, and fabricated from glass and bonded to said wafer by means of a diffusion bond.

14. The transducer according to claim 11 wherein said base plate is fabricated from silicon.

15. The transducer according to claim 10 wherein said reference pressure is atmospheric pressure derived from a relatively clean environment, with said another pressure being a pressure to be measured with respect to said reference pressure and derived from a relatively deleterious atmosphere.

16. The transducer according to claim 9 wherein said circuit arrangement is a Wheatstone bridge configuration with one arm of said bridge comprising a first terminal having connected thereto, a terminal of said peripheral sensor of said first circuit arrangement in series with said central sensor between a second terminal, and said other arm comprising a terminal of said peripheral sensor of said second circuit arrangement connected to said first terminal in series with said associated sensor between said second terminal.

17. The transducer according to claim 10 wherein said base plate is fabricated from glass.

* * * * *